United States Patent
Sartor et al.

(10) Patent No.: US 11,986,095 B2
(45) Date of Patent: May 21, 2024

(54) RETRACTABLE FURNITURE CARRIAGE

(71) Applicant: Foldcraft Co., Kenyon, MN (US)

(72) Inventors: Dave Sartor, Nerstrand, MN (US); Eric Weis, Oronoco, MN (US)

(73) Assignee: Foldcraft Co., Kenyon, MN (US)

( * ) Notice: Subject to any disclaimer, the term of this patent is extended or adjusted under 35 U.S.C. 154(b) by 776 days.

(21) Appl. No.: 17/110,949

(22) Filed: Dec. 3, 2020

(65) Prior Publication Data

US 2022/0175146 A1 Jun. 9, 2022

(51) Int. Cl.
*B60B 33/06* (2006.01)
*A47C 17/04* (2006.01)

(52) U.S. Cl.
CPC ............ *A47C 17/04* (2013.01); *B60B 33/066* (2013.01)

(58) Field of Classification Search
CPC .............. B60B 33/066; A63B 71/0036; A63B 2210/58
See application file for complete search history.

(56) References Cited

U.S. PATENT DOCUMENTS

| | | | |
|---|---|---|---|
| 723,692 A | 3/1903 | Litsey | |
| 1,280,795 A * | 10/1918 | Martin | B62B 1/08 280/46 |
| 2,042,489 A | 6/1936 | Williams | |
| 2,409,805 A | 10/1946 | Shikles | |
| 2,578,488 A | 12/1951 | Placerean | |
| 2,628,068 A * | 2/1953 | Sehnert | B62B 3/0625 414/458 |
| 2,697,243 A | 12/1954 | Shager | |
| 2,783,055 A * | 2/1957 | Michaud | D06F 39/125 16/34 |
| 2,788,219 A | 4/1957 | McClellan | |
| 2,812,189 A | 11/1957 | Geldhof | |
| 2,814,498 A * | 11/1957 | Hull | B65D 19/42 280/43.24 |
| 2,843,392 A | 7/1958 | Simpkins | |
| 2,854,044 A | 9/1958 | Raguse | |
| 2,923,373 A | 2/1960 | Ledgerwood | |
| 2,937,850 A | 5/1960 | Winkler et al. | |
| 2,993,740 A | 7/1961 | Good | |
| 3,026,557 A | 3/1962 | Mallonee | |
| 3,054,623 A | 9/1962 | Simpkins | |
| 3,400,504 A | 9/1968 | Nelsewander | |
| 3,633,242 A | 1/1972 | Wasofsky | |
| 3,845,933 A | 11/1974 | Heizer, Jr. | |
| 4,054,096 A | 10/1977 | Wilson et al. | |
| 4,392,436 A | 7/1983 | Weiler | |

(Continued)

FOREIGN PATENT DOCUMENTS

| | | |
|---|---|---|
| EP | 2098138 A1 | 9/2009 |
| FR | 2604426 A1 | 4/1988 |

*Primary Examiner* — Tajash D Patel
(74) *Attorney, Agent, or Firm* — Stinson LLP (57) ABSTRACT

A retractable furniture carriage is capable of supporting a piece of furniture off of a floor, and allowing the furniture to be rolled across the floor. The retractable furniture carriage includes wheels mounted by a frame to the furniture. The frame can be pivoted for moving the wheels between a deployed position in which they engage and support the furniture to a stowed position in which the wheels are off the floor. Actuation of the frame can be carried out from the side of the furniture through frame structure largely located underneath the furniture.

26 Claims, 9 Drawing Sheets

(56) References Cited

U.S. PATENT DOCUMENTS

| | | | |
|---|---|---|---|
| 4,815,760 A * | 3/1989 | Dooley | F16M 11/42 |
| | | | 280/47.131 |
| 5,193,828 A | 3/1993 | Benvenuti | |
| 5,347,682 A | 9/1994 | Edgerton, Jr. | |
| 5,615,451 A | 4/1997 | Peterson et al. | |
| 5,628,522 A * | 5/1997 | Hall | B60B 33/06 |
| | | | 280/46 |
| 5,876,173 A | 3/1999 | English, Jr. | |
| 5,957,649 A | 9/1999 | English, Jr. et al. | |
| 6,079,931 A * | 6/2000 | English, Jr. | B60B 33/0049 |
| | | | 254/8 R |
| 6,311,992 B1 | 11/2001 | Theising | |
| 6,409,291 B1 | 6/2002 | Johnson | |
| 6,533,524 B2 | 3/2003 | English, Jr. et al. | |
| 6,659,706 B2 | 12/2003 | English, Jr. et al. | |
| 6,715,979 B1 | 4/2004 | Theising et al. | |
| 6,837,665 B2 | 1/2005 | English, Jr. et al. | |
| 6,971,656 B2 | 12/2005 | Lin | |
| 7,077,406 B2 | 7/2006 | Lin | |
| 7,112,028 B2 | 9/2006 | English, Jr. et al. | |
| 7,584,935 B2 | 9/2009 | Chen | |
| 8,511,693 B2 | 8/2013 | Gass et al. | |
| 8,657,306 B2 | 2/2014 | Chiu | |
| 8,919,361 B2 | 12/2014 | Ma | |
| 9,370,265 B2 | 6/2016 | Whittington et al. | |
| 9,557,000 B2 | 1/2017 | Chang | |
| 9,615,665 B2 | 4/2017 | Whittington et al. | |
| 9,738,116 B1 | 8/2017 | Rivera, Jr. et al. | |
| 9,980,583 B2 | 5/2018 | Rivera, Jr. et al. | |
| 10,272,316 B2 * | 4/2019 | Hedberg | A63B 21/078 |
| 10,376,062 B2 | 8/2019 | Rivera, Jr. et al. | |
| 2001/0041125 A1 | 11/2001 | English, Jr. et al. | |
| 2022/0324280 A1 * | 10/2022 | Sheikh Jafari | B60B 33/0063 |
| 2023/0211633 A1 * | 7/2023 | Herman | B60B 33/066 |
| | | | 16/33 |

\* cited by examiner

RETRACTABLE FURNITURE CARRIAGE

BACKGROUND

The present invention generally relates to an apparatus useful for moving furniture and more particularly to a retractable furniture carriage that can retract when not needed.

Furniture, particularly furniture that is used in commercial and institutional settings (e.g., restaurants and schools) can be bulky and difficult for one person to move. For example, the size, configuration and weight of the furniture does not lend the furniture to being moved with equipment such as a dolly or the like. Although some furniture comes with deployable wheels, it still requires significant effort to get the wheels in place. Moreover, integrated wheels may not be aesthetically pleasing or may interfere with comfortably using the furniture as intended.

SUMMARY

In one aspect of the present invention, a retractable furniture carriage for furniture having support structure disposed to engage and support the furniture on an underlying surface generally comprises a first wheel set and a second wheel set. A first frame member configured to be mounted on the furniture for pivoting about a first axis attaches the first wheel set for movement with the first frame member. A second frame member configured to be mounted on the furniture for pivoting about a second axis parallel to the first axis attaches the second wheel set for movement with the second frame member. The first and second frame members are operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets. An actuation lever operatively connected to the first and second frame members can drive the first and second frame members to move from the stowed position to the deployed position. The actuation lever includes a foot pad projecting from the actuation lever along a direction parallel to the first axis and the second axis about which the first frame member and second frame member respectively pivot.

In another aspect of the present invention, a retractable furniture carriage for furniture having support structure disposed to engage and support the furniture on an underlying surface generally comprises a first wheel set and a second wheel set. A first frame member configured to be mounted on the furniture for pivoting about a first axis attaches the first wheel set for movement with the first frame member. A second frame member configured to be mounted on the furniture for pivoting about a second axis parallel to the first axis attaches the second wheel set for movement with the second frame member. The first and second frame members are operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets. An actuation lever operatively connected to the first and second frame members can drive the first and second frame members to move from the stowed position to the deployed position. The actuation lever comprises a first arm connected to the first frame member and extending in a direction transverse to the first axis of the first frame member and a second arm connected to the second frame member and extending in a direction transverse to the second axis of the second frame member. A keeper is configured to pivot about a third axis parallel to the first and second axes between a locked position in which the keeper blocks movement of at least one of the first and second arms to hold the first and second frame members in the deployed position, and an unlocked position in which the keeper does not block movement of at least one of the first and second arms to permit the first and second frame members to move to the stowed position.

In yet another aspect of the present invention, a retractable furniture carriage for furniture having support structure disposed to engage and support the furniture on an underlying surface generally comprises a first wheel set and a second wheel set. A first frame member is configured to be mounted on the furniture for pivoting about a first axis attaches the first wheel set for movement with the first frame member. A second frame member is configured to be mounted on the furniture for pivoting about a second axis attaches the second wheel set for movement with the second frame member. The first and second frame members are operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets. An actuation lever operatively connected to the first and second frame members can drive the first and second frame members to move from the stowed position to the deployed position. The actuation lever comprises a first arm connected to the first frame member and projecting from the first frame member and a second arm connected to the second frame member and projecting from the second frame member. A cam fixedly mounted on the first arm projects horizontally from the first arm in a position to engage the second arm for driving movement of the second frame member from the stowed position to the deployed position upon movement of the first arm to drive the first frame member from the stowed position to the deployed position.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
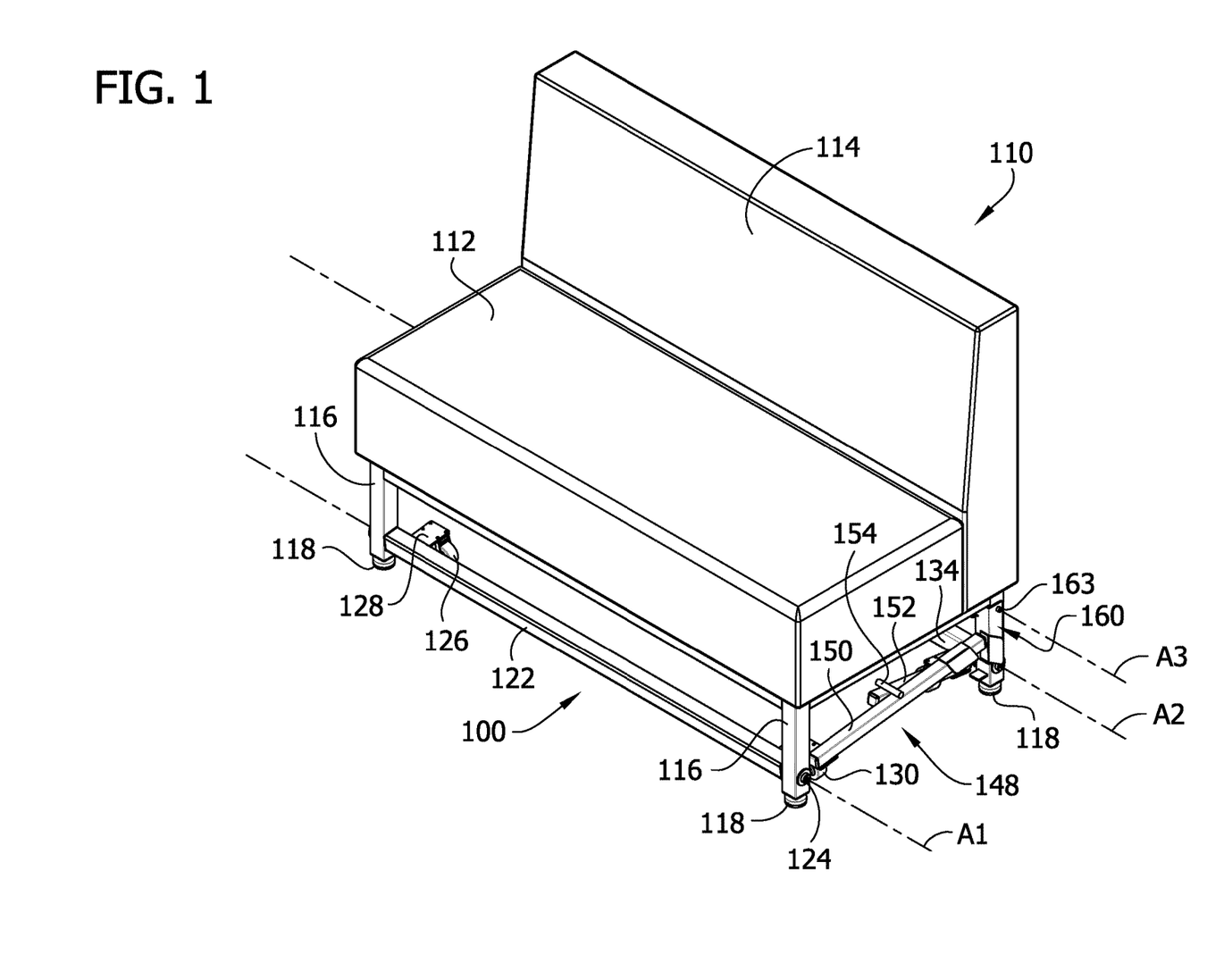
FIG. 1 is a perspective view of a bench seat with a retractable furniture carriage integrated into the bench seat, and in a stowed position.
Figure 2:
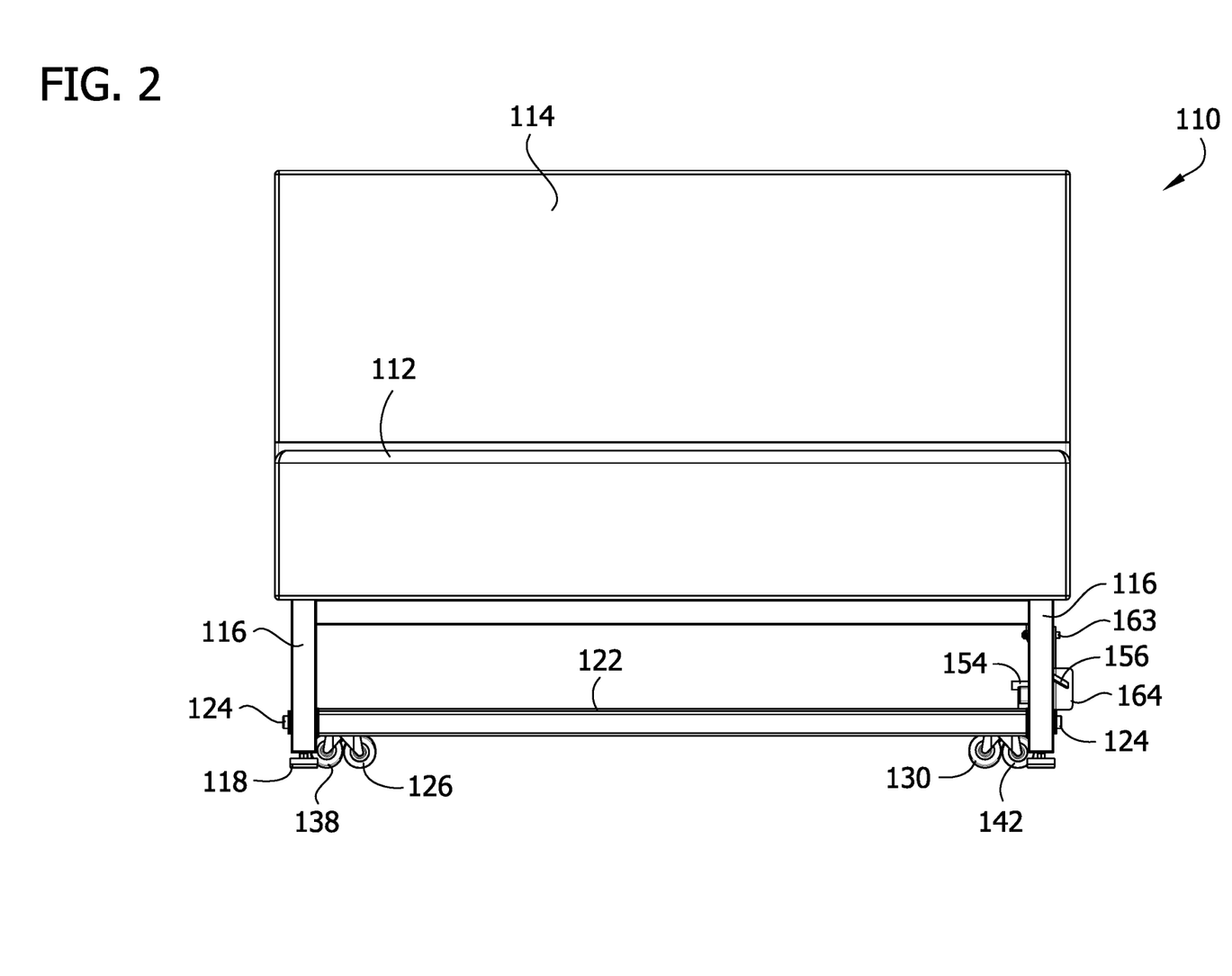
FIG. 2 is a front view thereof.
Figure 3:
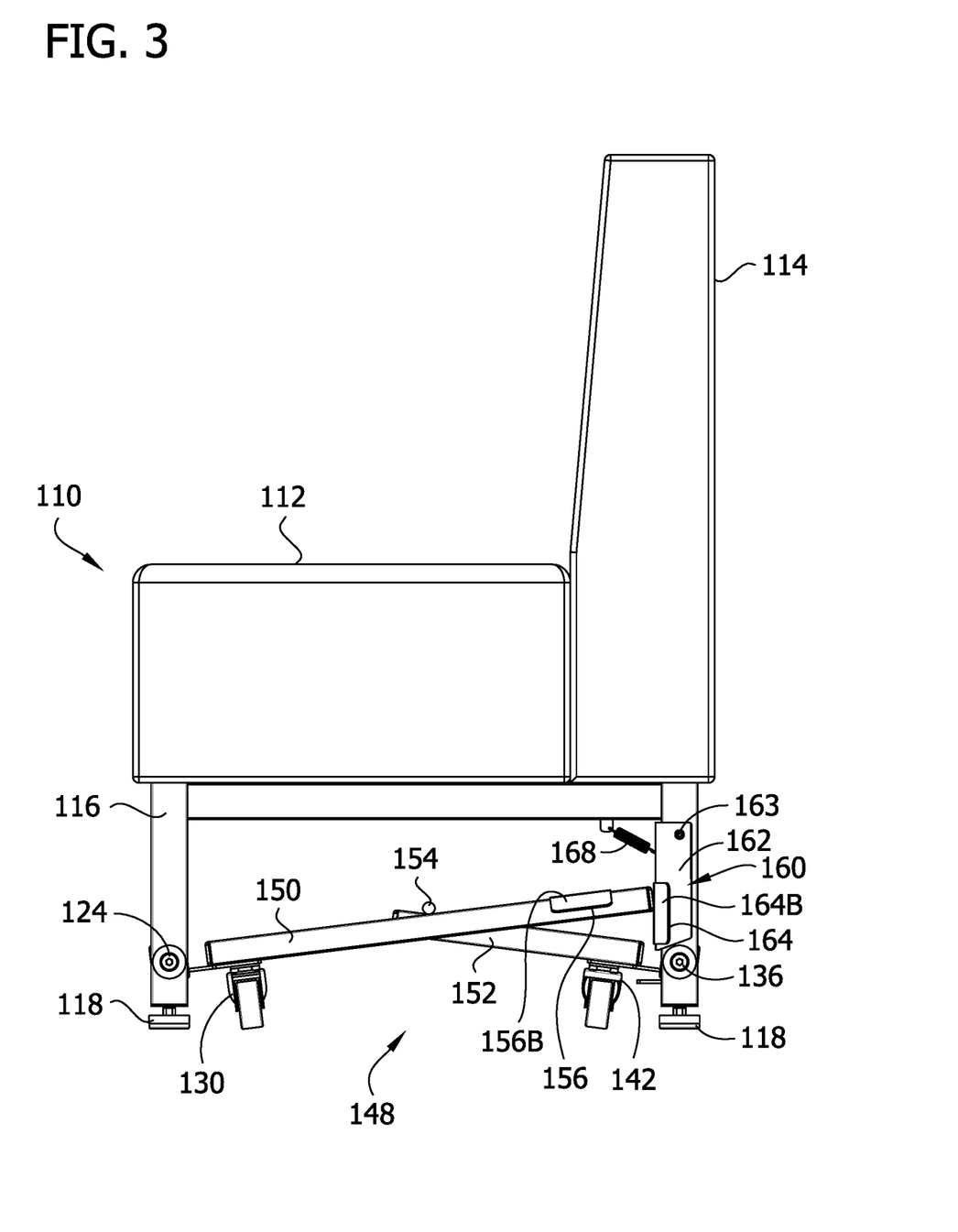
FIG. 3 is an enlarged right side view thereof.

Referring now to the drawings and in particular to FIGS. 1-3, a furniture carriage constructed according to the principles of the present invention is generally designated at 100. The furniture carriage is shown attached or "integrated" into a bench seat 110, such as might be used in a restaurant or institutional setting. Although shown integrated into a bench seat, a furniture carriage could be used with other types of furniture within the scope of the present invention. Moreover, the furniture carriage 100 as integrated with a particular piece of furniture, such as bench seat 110, or separate from the furniture are both embodiments of the present invention. The bench seat 110 includes a bench 112, a back rest 114 and four legs 116 (broadly, "support structure") extending down from the bench for engaging an underlying support surface, such as a floor. In the illustrated embodiment, the legs 116 include feet 118 that can be adjusted for leveling the bench seat 110. The feet 118 engage the floor and generally inhibit movement of the bench seal 110 with respect to the floor.

Figure 4:
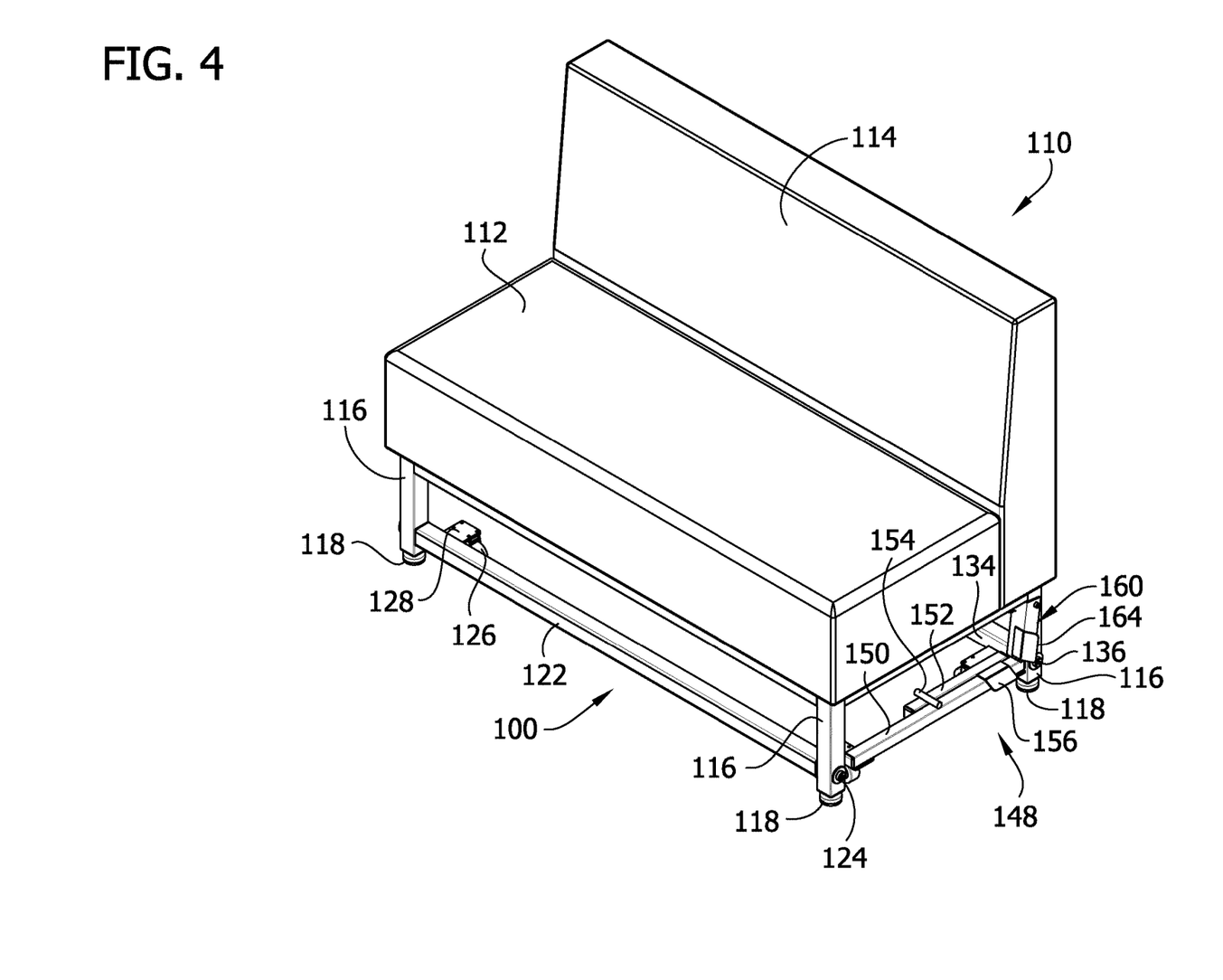
FIG. 4 is a perspective view of the bench seat and integrated retractable furniture carriage in a deployed position.
Figure 5:
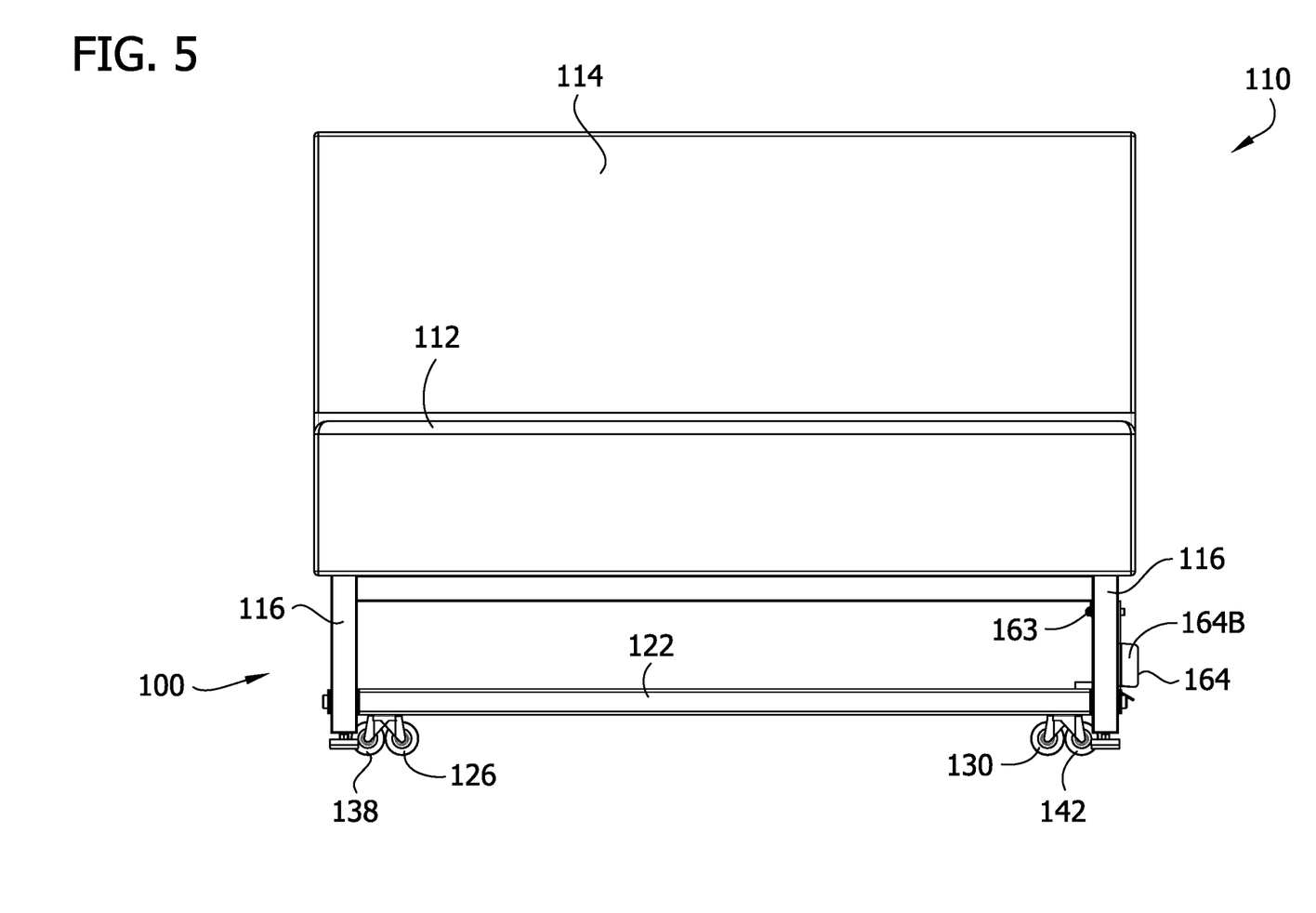
FIG. 5 is a front view thereof.
Figure 6:
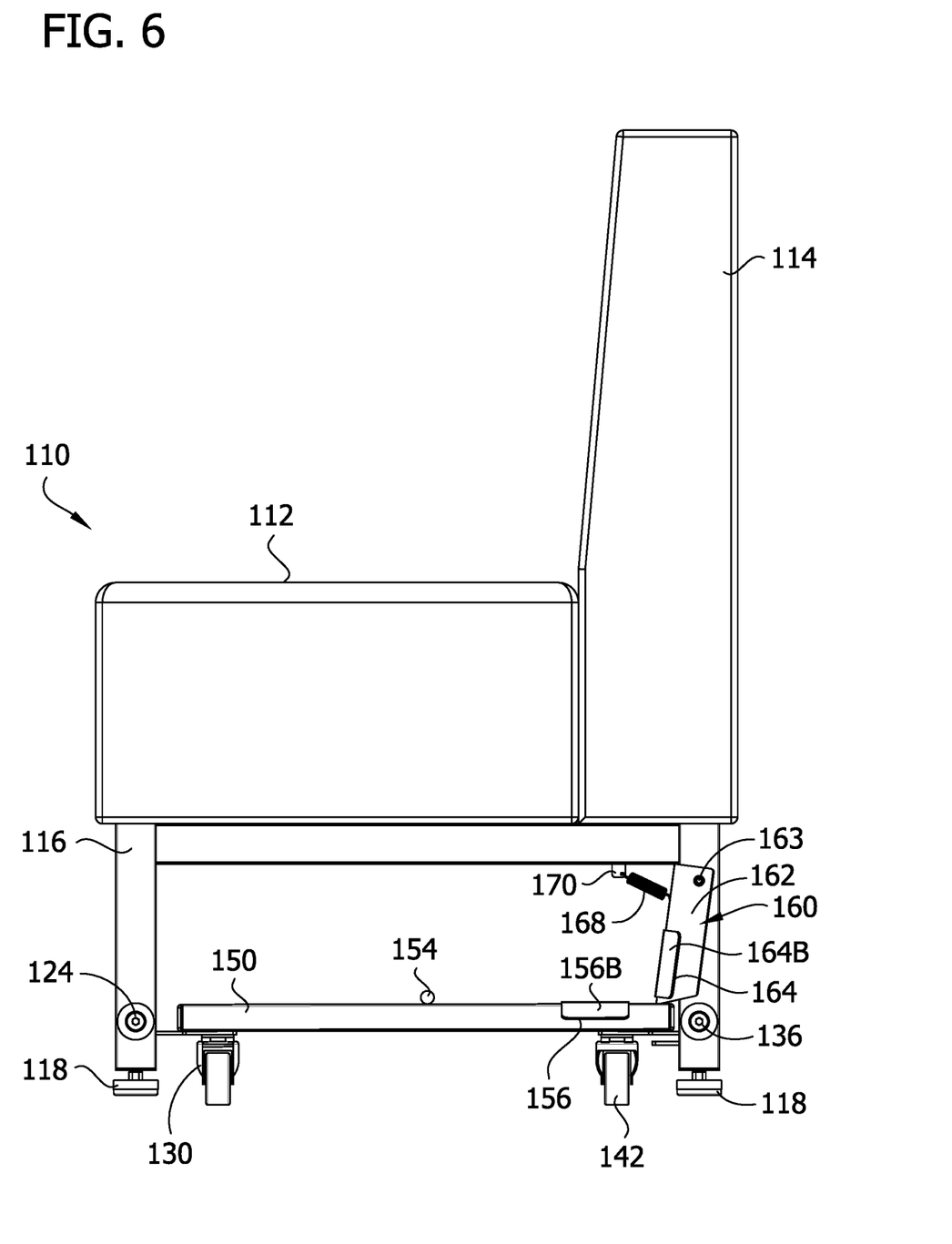
FIG. 6 is an enlarged right side view thereof.

The furniture carriage 100 can move between a stowed position (as shown in FIGS. 1-3) in which the furniture carriage is retracted above the floor so that the feet 118 of the legs 116 engage the floor and support the bench seat 110, and a deployed position (as shown in FIGS. 4-6) in which the furniture carriage lifts the bench seat off of the floor so that the bench seat can be moved around using the furniture carriage. The details of this functionality will be more fully described hereinafter. The furniture carriage 100 is capable of being connected to the bench seat 110 in an essentially semi-permanent manner. In other words, the furniture carriage 100 is intended to remain connected to the bench seat 110 while it is being used, and can be deployed when it is desired to move the bench seat. The furniture carriage 100 could be removed when not in use, but provides an additional benefit of not requiring removal after use as it is almost entirely disposed beneath the bench 112.

The furniture carriage 100 includes a first frame member 122 in the form of an angle iron extending between the legs 116 at the front of the bench seat 110. The first frame member 122 is attached by pivots 124 at opposite ends of the first frame member to the front legs 116 for pivoting about a first axis A1. The first frame member 122 mounts a first wheel set including a first caster 126 attached to the first frame member by a flange 128 and a second caster 130 attached to the first frame member by a flange 132. A second frame member 134 is an angle iron extending between legs 116 at the rear of the bench. The second frame member 134 is attached by pivots 136 to the back legs 116 at each end of the second frame member for pivoting about a second axis A2. The second frame member 134 mounts a second wheel set in the form of a first caster 138 attached by a flange 140 to the second frame member, and a second caster 142 attached by a flange 144 to the second frame member.

Although the first and second frame members 122, 134 are shown as a one-piece angle irons, the first and second frame member may have other configurations and may include multiple pieces. The first and second frame members 122, 134 may be considered to collectively form a frame of the furniture carriage 100. Moreover, the first and second wheel sets may include one or more wheels, casters or other suitable rolling or sliding support that can engage the floor to permit the bench seat 110 to be easily pushed across the floor.

Figure 9:
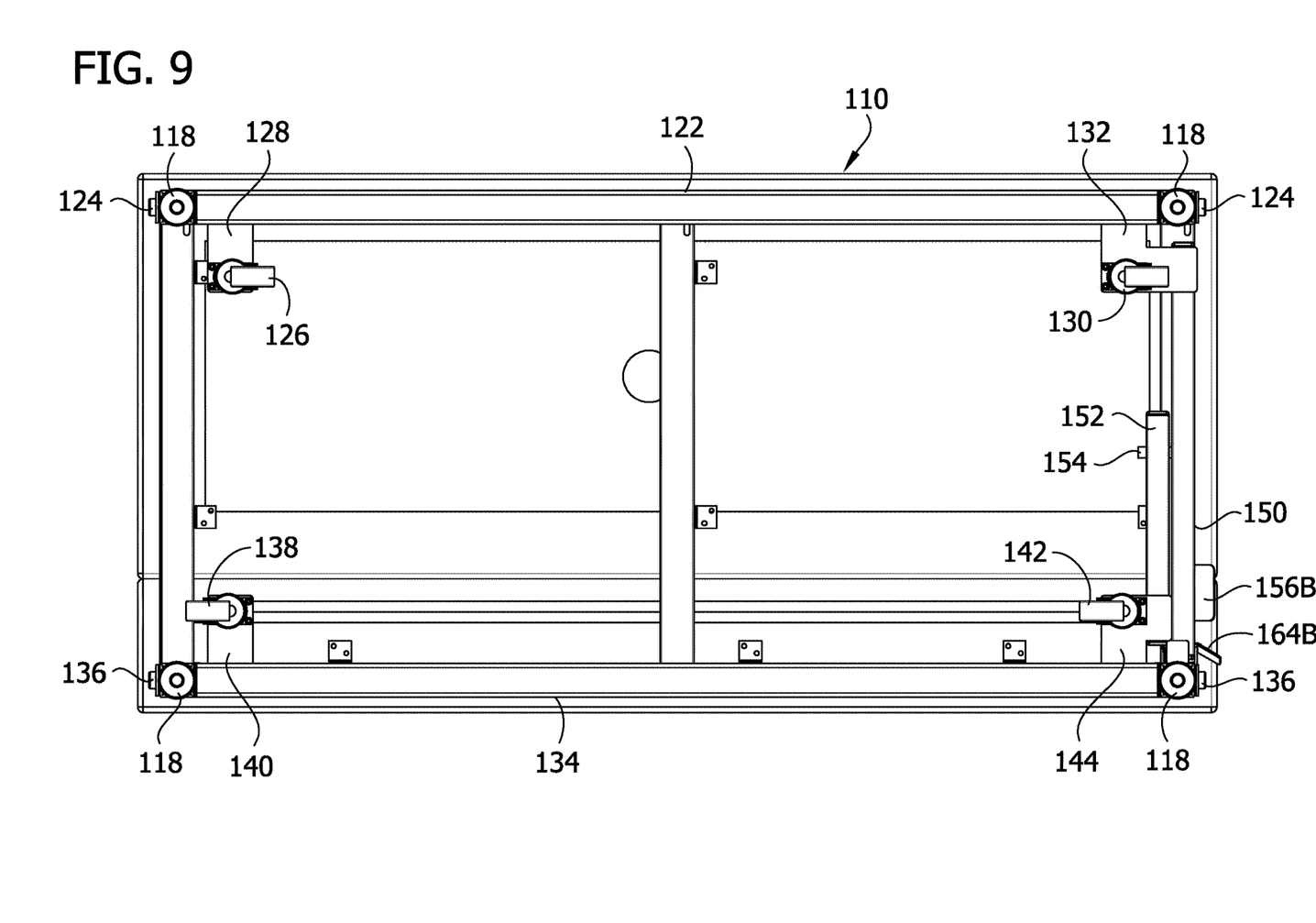
FIG. 9 is a bottom plan view of the bench seat and furniture carriage.

Movement of the furniture carriage 100 from the stowed position to the deployed position is actuated by an actuation lever, indicated generally at 148. The actuation lever 148 is operatively connected to the first frame member 122 and the second frame member 134. The actuation lever 148 comprises a first arm 150 rigidly attached at one end to the first frame member 122, and projects in a direction perpendicular (broadly, "transverse") to the first axis of rotation A1 of the first frame member. The first arm 150 is attached to the first frame member 122 by way of the flange 132 that also connects the second caster 130 to the first frame member. Referring to FIG. 9, the flange 132 is generally L-shaped. The second caster 130 is attached on the bottom of the flange 132 and the first arm 150 is attached on the top of the flange. The connection is rigid so that a force applied to the first arm 150 is transmitted to the first frame member 122 by the flange 132 to pivot the first frame member on the pivots 124. The actuation lever 148 further comprises a second arm 152 that projects orthogonally from (broadly, "transverse to") the second axis of rotation A2 of the second frame member 134. The second arm 152 is rigidly attached at one end the second frame member 134 by the flange 144 that also connects the second caster 142 to the second frame member. The flange 144, similar to the flange 132, is generally L-shaped. The second caster 142 is attached on the bottom of the flange 144 and the second arm 152 is attached on the top of the flange. The rigid connection of the second arm 152 via the flange 144 to the second frame member 134 allows forces applied to the second arm to be transmitted to the second frame member to pivot the second frame member on the pivots 136. It may be seen in FIG. 9, that the actuation lever 148 lies entirely between the (first) axis of rotation of the first frame member 122 and the (second) axis of rotation of the second frame member 134.

The first and second arms 150, 152 are operatively connected to each other so that movement from the stowed position to the deployed position occurs conjointly. In that regard, the actuation lever 148 further includes a pin 154 (broadly, a "cam") that is fixed as by welding to the first arm 150. The pin 154 projects horizontally inwardly of the bench seat 110 and overlies the second arm 152. Thus, as the first arm 150 pivots in a downward direction the pin 154 engages the second arm 152 forcing it to likewise pivot downwardly. The pin 154 slides across the top surface of the second arm 152 as it pushes the second arm downward. The first arm 150 has a foot pad 156 rigidly attached to the first arm near the end of the arm that is rigidly connected to the first frame member 122. The foot pad 156 includes a mounting portion 156A and a bent portion 156B that extends from a bend in the foot pad at a downward angle to the mounting portion. The foot pad 156 extends from the first arm 150 along a direction parallel to the first and second axes and transverse to a lengthwise extent of the first arm. Even though the bent portion 156B is at an angle to the first and second axes A1, A2, the foot pad 156 is still considered to extend from the first arm 150 along a direction that is parallel to the first and second axes. As may be seen in FIG. 9, the bent portion 156B is located under the bench seat 110. The bent portion 156 provides an angle for a laborer's foot to easily engage the foot pad 156 even though it is underneath the bench seat 110 for pushing the first arm 150 downward to move the furniture carriage 100 to the deployed position. In this way the foot pad 156 remains out of the way when the bench seat 110 is in normal use and the furniture carriage 100 is in the stowed position (e.g., as shown in FIGS. 1-3).

A keeper, generally indicated at 160, is provided to hold the first and second frame members 122, 134 in the deployed position (FIGS. 3-10). When the furniture carriage 100 is moved to the deployed position, the casters 126, 130, 138, 142 engage the floor and hold the bench seat 110 (and in particular the feet 118 at the bottoms of the legs 116) off of the floor. It will be understood that the weight of the bench seat 110 biases the first and second frame members 122, 134 to pivot back to the stowed position in which the casters 126, 130, 138, 142 do not support the bench seat, and the feet 118 rest upon the floor and support the weight of the bench seat. The keeper 160 prevents movement from the deployed position back to the stowed position until is it desired to do so.

Figure 7:
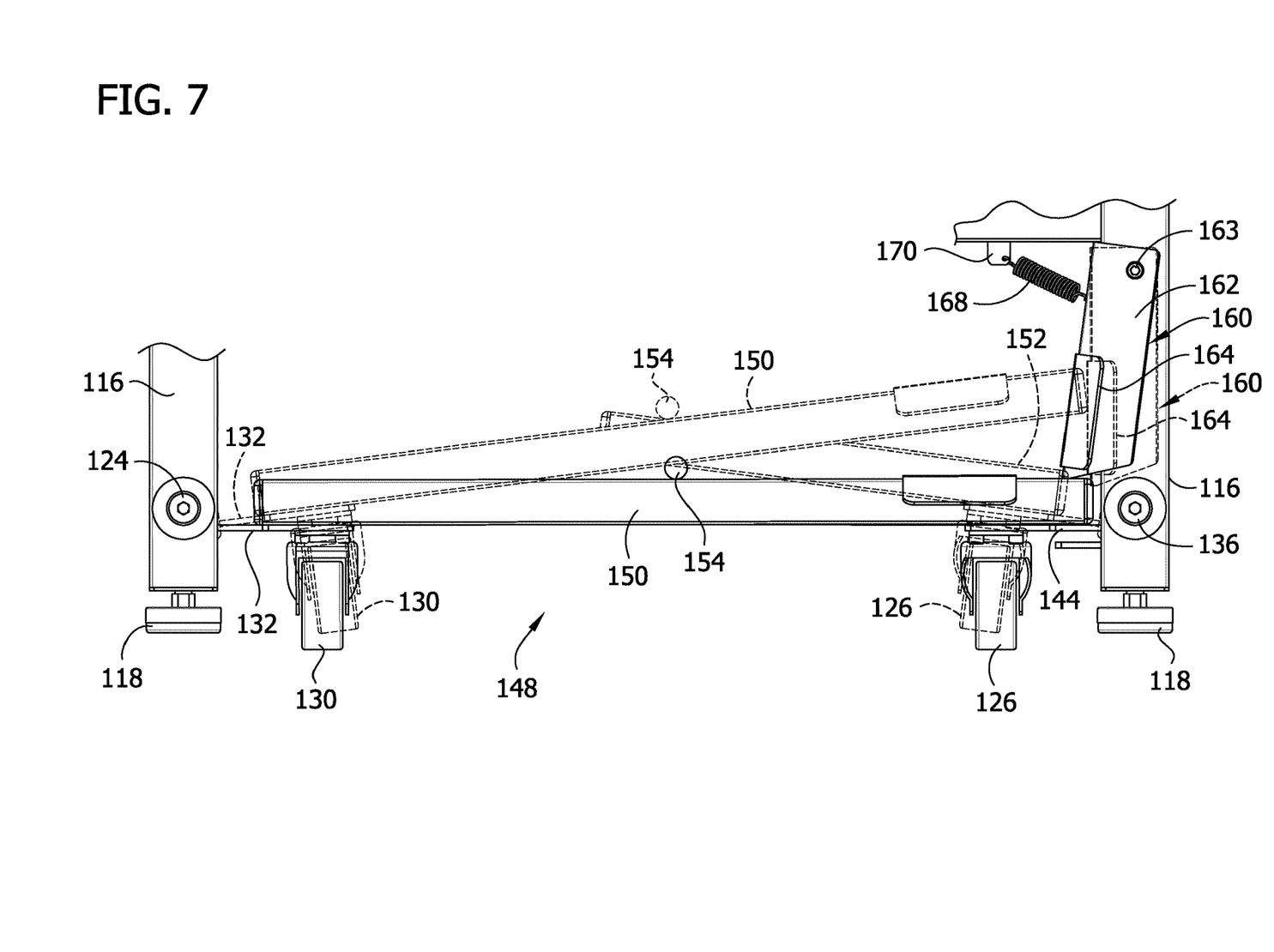
FIG. 7 is an enlarged, fragment of the side view of FIG. 6, showing the deployed position of the furniture carriage in solid lines and the retracted position in phantom lines.
Figure 8:
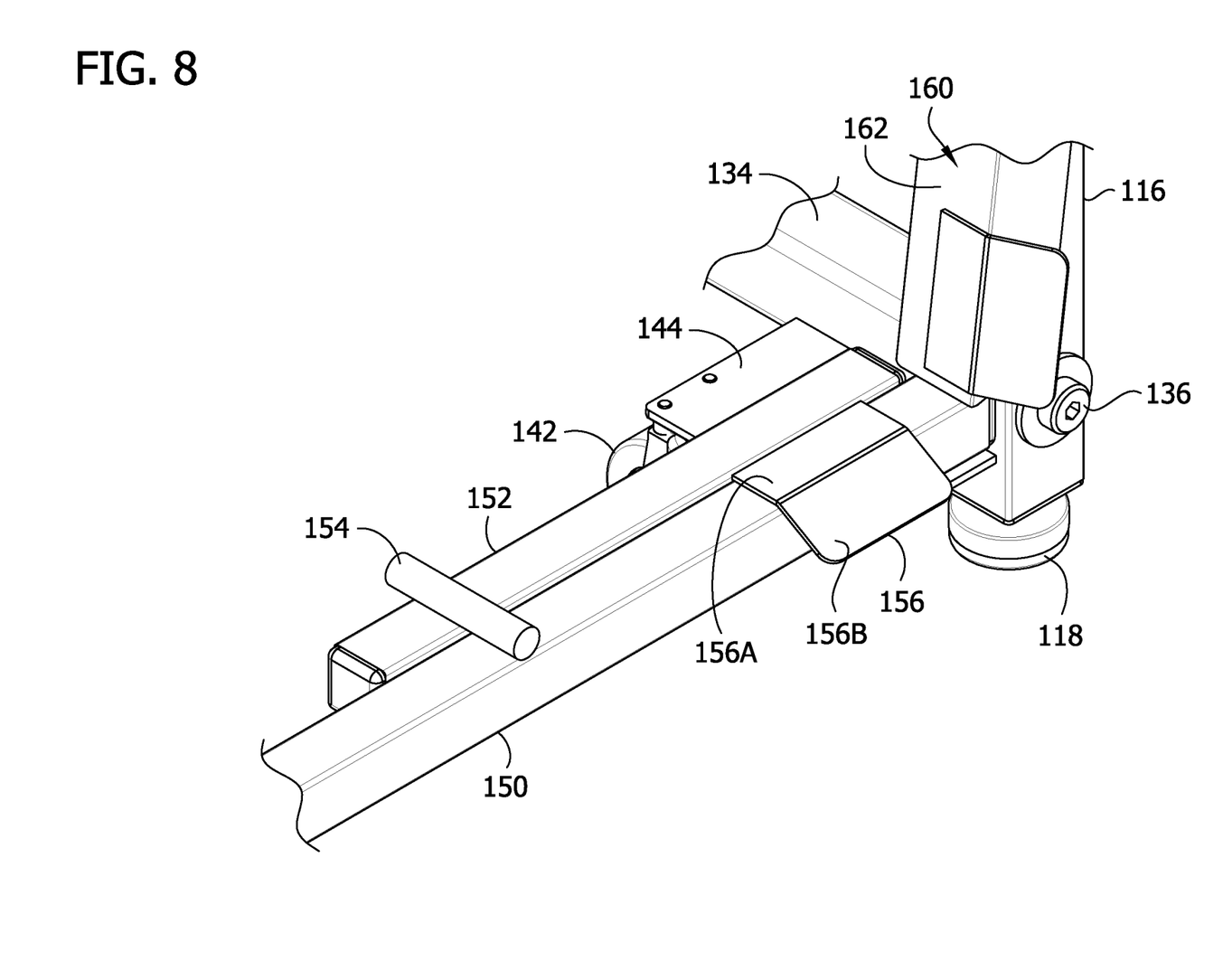
FIG. 8 is an enlarged, fragmentary perspective the bench seat and furniture carriage showing a region near a right rear leg of the bench seat.

Referring now particularly to FIGS. 6-8, the keeper 160 includes a keeper bar 162 that is mounted on the right rear leg 116 of the bench seat 110 by a pivot 163 for pivoting about a third axis A3 parallel to the first axis A1 about which the first frame member 122 pivots and the second axis A2 about which the second frame member 134 pivots (see, FIG. 1). In the illustrated embodiment, the keeper bar 162 is an angle iron that fits in a complementary fashion around the leg 116. The keeper 160 further includes a foot pad 164 having a mounting portion 164A secured as by welding to the keeper bar 162 and a bent portion 164B extending from a bend in the foot pad in a rearwardly directed angle. As may be seen in FIG. 9, the bent portion 164B extends to the edge of the perimeter of the bench seat 110 and slightly beyond. Thus, the foot pad 164 is almost entirely disposed underneath the bench seat 110 (i.e., within the perimeter of the bench 112) and out of the way. Indeed, the entire furniture carriage 100 is located substantially within the perimeter of the bench 112 of the bench seat 110 (broadly, "within the perimeter of the furniture") in the illustrated embodiment. It is contemplated that the entirety of the furniture carriage 100 may be located within the perimeter of the bench seat 110. The angulation of the bent portion 164B causes a flat face of the bent portion to present in a direction out from underneath the bench 112. In this orientation, the bent portion 164B is, notwithstanding its location essentially entirely under the bench 112, accessible to be engaged by a laborer's foot to pivot the keeper 160 about the third axis A3.

FIG. 7 shows the furniture carriage 100 in the deployed position in solid lines and in the stowed position in phantom lines. In the deployed position, the keeper 160 is pivoted outward at its lower end from the leg 116 to that the free end of the keeper bar 162 is positioned over and engages the first arm 150 near its free end. A spring 168 attached at one end by a tab 170 to the underside of the bench 112 and at another end to the keeper bar 162 biases the keeper 160 to a locked position in which the keeper 160 is over the first arm 150. The keeper 160 can be pivoted against the bias of the spring 168 from the locked position to an unlocked position in which the keeper bar 162 is not over the first arm 150 and generally conforms to the leg 116. Pivoting to the unlocked position can be accomplished by a laborer standing next to the beat seat 110 by engaging the bent portion 164B of the foot pad with his foot and pushing rearward. In the unlocked position, the free end of the first arm 150 opposes a portion of the keeper bar 162 so that the keeper bar cannot move back to the locked position under the urging of the spring 168.

To activate the furniture carriage 100 to support the bench seat 110 to be rolled across the floor, the laborer in a standing position next to the right side of the bench 112 engages the foot pad 156 and pushes down. The application of this force causes the first arm 150 to pivot the first frame member 122. Simultaneously, the pin 154 secured on the first arm 150 slidingly engages the second arm 152 to push it down and cause the second frame member 134 to pivot. The pivoting movement of the first and second frame members 122, 134 forces the first and second casters 126, 130, 140, 142 to move down into engagement with the floor and lift the bench seat 110 (including specifically the foot pads 118) off of the floor. When the first arm 150 gets to a sufficiently horizontal position that the free end of the first arm clears a bottom end of the keeper bar 162, the spring 168 causes the keeper 160 to pivot from the unlocked position to the locked position over the first arm. In the locked position, the laborer may remove foot pressure from the foot pad 156. The weight of the bench seat 110 borne by the caster wheels 126, 130, 140, 142 urges the first and second frame members 122, 134 to pivot back toward the stowed position. However, this movement is now blocked by the keeper 160 in its locked position. The first arm 150 directly engages the keeper bar 162 and is stopped from pivoting. The pin 154 fixed to the first arm engages the second arm 152 and likewise prevents the second arm from pivoting. In this way, the furniture carriage 100 is held in the deployed position for easily moving the bench seat 110 across the floor.

When introducing elements of the present invention or the one or more embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus, systems, and methods without departing from the scope of the invention, it is intended that all matter contained in the above description and shown in the accompanying drawings shall be interpreted as illustrative and not in a limiting sense.

What is claimed is:

1. A retractable furniture carriage for furniture having support structure disposed to engage and support the furniture on an underlying surface, the retractable furniture carriage comprising:
  a first wheel set;
  a second wheel set;
  a first frame member configured to be mounted on the furniture for pivoting about a first axis, the first wheel set being attached to the first frame member for movement with the first frame member;
  a second frame member configured to be mounted on the furniture for pivoting about a second axis parallel to the first axis, the second wheel set being attached to the second frame member for movement with the second frame member, the first and second frame members being operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets;

an actuation lever operatively connected to the first and second frame members for driving the first and second frame members to move from the stowed position to the deployed position, the actuation lever including a foot pad projecting from the actuation lever in a direction parallel to the first axis and the second axis about which the first frame member and second frame member respectively pivot, the foot pad being located between the first axis of the first frame member and the second axis of the second frame member.

2. A retractable furniture carriage for furniture having support structure disposed to engage and support the furniture on an underlying surface, the retractable furniture carriage comprising:

a first wheel set;

a second wheel set;

a first frame member configured to be mounted on the furniture for pivoting about a first axis, the first wheel set being attached to the first frame member for movement with the first frame member;

a second frame member configured to be mounted on the furniture for pivoting about a second axis parallel to the first axis, the second wheel set being attached to the second frame member for movement with the second frame member, the first and second frame members being operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets;

an actuation lever operatively connected to the first and second frame members for driving the first and second frame members to move from the stowed position to the deployed position, the actuation lever including a foot pad projecting from the actuation lever in a direction parallel to the first axis and the second axis about which the first frame member and second frame member respectively pivot;

wherein the first and second frame members each include first and second opposite ends, and wherein the actuation lever comprises a first arm attached to the first frame member at a first end of the first arm and extending with respect to the first frame member along a direction transverse to the first axis, the first arm being spaced from the first ends of the first and second frame members in the direction of the first and second axes.

3. The retractable furniture carriage as set forth in claim 2 wherein the actuation lever is located between the first axis and the second axis.

4. The retractable furniture carriage as set forth in claim 1 wherein the foot pad projects laterally from the actuation lever, first frame member and second frame member toward a side of the furniture when the first and second frame members are mounted on the furniture.

5. The retractable furniture carriage as set forth in claim 4 wherein the foot pad includes a bent portion extending in a direction toward the underlying support surface when the first and second frame members are mounted on the furniture.

6. The retractable furniture carriage as set forth in claim 1 further comprising a keeper pivotable about a third axis parallel to the first axis and the second axis between a locked position in which the keeper blocks the actuation lever to hold the first and second frame members in the deployed position, and an unlocked position in which the keeper does not block the actuation lever so that the first and second frame members can move to the stowed position.

7. The retractable furniture carriage as set forth in claim 6 wherein the keeper comprises a keeper bar and a foot pad projecting from the keeper bar in the direction of the first and second axes.

8. The retractable furniture carriage as set forth in claim 7 further comprising a spring connected to the keeper and biasing the keeper toward the locked position.

9. A retractable furniture carriage for furniture having support structure disposed to engage and support the furniture on an underlying surface, the retractable furniture carriage comprising:

a first wheel set;

a second wheel set;

a first frame member configured to be mounted on the furniture for pivoting about a first axis, the first wheel set being attached to the first frame member for movement with the first frame member;

a second frame member configured to be mounted on the furniture for pivoting about a second axis parallel to the first axis, the second wheel set being attached to the second frame member for movement with the second frame member, the first and second frame members being operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets;

an actuation lever operatively connected to the first and second frame members for driving the first and second frame members to move from the stowed position to the deployed position, the actuation lever including a foot pad projecting from the actuation lever in a direction parallel to the first axis and the second axis about which the first frame member and second frame member respectively pivot, the actuation lever comprising a first arm attached to the first frame member and extending with respect to the first frame member along a direction transverse to the first axis toward the second frame member, the retractable furniture carriage comprising a second arm attached to the second frame member and extending with respect to the second frame member along a direction transverse to the second axis toward the first frame member.

10. The retractable furniture carriage as set forth in claim 9 wherein the actuation lever further comprises a cam fixedly mounted on the first arm and positioned for engagement with the second arm so that upon movement of the actuation lever to drive the first frame member from the stowed position to the deployed position the cam engages the second arm to drive the second arm and the second frame member from the stowed position to the deployed position.

11. The retractable furniture carriage as set forth in claim 10 wherein the cam comprises a pin attached to the first arm and projecting from the first arm.

12. A retractable furniture carriage for furniture having support structure disposed to engage and support the furniture on an underlying surface, the retractable furniture carriage comprising:
   a first wheel set;
   a second wheel set;
   a first frame member configured to be mounted on the furniture for pivoting about a first axis, the first wheel set being attached to the first frame member for movement with the first frame member;
   a second frame member configured to be mounted on the furniture for pivoting about a second axis parallel to the first axis, the second wheel set being attaching to the second frame member for movement with the second frame member, the first and second frame members being operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets;
   an actuation lever operatively connected to the first and second frame members for driving the first and second frame members to move from the stowed position to the deployed position, the actuation lever comprising a first arm connected to the first frame member and extending in a direction transverse to the first axis of the first frame member and a second arm connected to the second frame member and extending in a direction transverse to the second axis of the second frame member;
   a keeper configured to pivot about a third axis parallel to the first and second axes between a locked position in which the keeper blocks movement of at least one of the first and second arms to hold the first and second frame members in the deployed position, and an unlocked position in which the keeper does not block movement of at least one of the first and second arms to permit the first and second frame members to move to the stowed position.

13. The retractable furniture carriage as set forth in claim 12 wherein the keeper is positioned to engage the first arm.

14. The retractable furniture carriage as set forth in claim 13 wherein the actuation lever further comprises a cam fixedly mounted on the first arm and positioned for engagement with the second arm so that upon movement of the actuation lever to drive the first frame member from the stowed position to the deployed position the cam engages the second arm to drive the second arm and the second frame member from the stowed position to the deployed position.

15. The retractable furniture carriage as set forth in claim 12 wherein the keeper comprises a keeper bar and a foot pad projecting from the keeper bar in the direction of the first and second axes.

16. The retractable furniture carriage as set forth in claim 13 further comprising a spring connected to the keeper and biasing the keeper toward the locked position.

17. A retractable furniture carriage for furniture having support structure disposed to engage and support the furniture on an underlying surface, the retractable furniture carriage comprising:
   a first wheel set;
   a second wheel set;
   a first frame member configured to be mounted on the furniture for pivoting about a first axis, the first wheel set being attached to the first frame member for movement with the first frame member;
   a second frame member configured to be mounted on the furniture for pivoting about a second axis, the second wheel set being attaching to the second frame member for movement with the second frame member, the first and second frame members being operatively connected for conjoint pivoting from a stowed position in which the first and second wheel sets are spaced from the underlying support surface and the support structure of the furniture engages the underlying surface and supports the furniture on the underlying surface, to a deployed position in which the first and second wheel sets engage the underlying support surface and hold the furniture support structure off of the underlying surface so that the furniture may be moved by rolling on the first and second wheel sets;
   an actuation lever operatively connected to the first and second frame members for driving the first and second frame members to move from the stowed position to the deployed position, the actuation lever comprising a first arm connected to the first frame member and extending in a direction transverse to the first axis of the first frame member, a second arm connected to the second frame member and extending in a direction transverse to the second axis of the second frame member and a cam fixedly mounted on the first arm and projecting horizontally from the first arm in a position to engage the second arm for driving movement of the second frame member from the stowed position to the deployed position upon movement of the first arm to drive the first frame member from the stowed position to the deployed position.

18. The retractable furniture carriage as set forth in claim 17 wherein the cam comprises a pin attached to the first arm.

19. The retractable furniture carriage as set forth in claim 18 wherein the pin is positioned for sliding engagement with the second arm during movement of the first and second frame members from the stowed position to the deployed position.

20. The retractable furniture carriage as set forth in claim 19 further comprising a keeper pivotable about a third axis between a locked position in which the keeper blocks the first arm to hold the first and second frame members in the deployed position, and an unlocked position in which the keeper does not block the first arm so that the first and second frame members can move to the stowed position.

21. The retractable furniture carriage as set forth in claim 17 in combination with a piece of furniture having a horizontal perimeter, the first and second frame members and first and second arms lying entirely within the horizontal perimeter of the furniture.

22. The retractable furniture carriage as set forth in claim 17 in combination with a piece of furniture to which the retractable furniture carriage is attached.

23. The retractable furniture carriage as set forth in claim 1 in combination with a piece of furniture to which the retractable furniture carriage is attached.

24. The retractable furniture carriage as set forth in claim 2 in combination with a piece of furniture to which the retractable furniture carriage is attached.

25. The retractable furniture carriage as set forth in claim 9 in combination with a piece of furniture to which the retractable furniture carriage is attached.

26. The retractable furniture carriage as set forth in claim 12 in combination with a piece of furniture to which the retractable furniture carriage is attached.

\* \* \* \* \*